United States Patent [19]
Hardison

[11] Patent Number: 5,941,667
[45] Date of Patent: *Aug. 24, 1999

[54] APPARATUS FOR SUPPORTING AND STABILIZING CARGO

[76] Inventor: Charles H. Hardison, 9603 Wickersham, Apt. No. 1107, Dallas, Tex. 75238

[ * ] Notice: This patent issued on a continued prosecution application filed under 37 CFR 1.53(d), and is subject to the twenty year patent term provisions of 35 U.S.C. 154(a)(2).

[21] Appl. No.: 08/779,467

[22] Filed: Jan. 7, 1997

[51] Int. Cl.$^6$ .................................................. B60P 7/15
[52] U.S. Cl. .......................... 410/146; 410/144; 410/145; 410/148; 410/143
[58] Field of Search ..................... 410/143–150; 211/105.2, 94; 248/354.1, 354.6, 200.1; 296/40

[56] References Cited

U.S. PATENT DOCUMENTS

| | | | |
|---|---|---|---|
| 2,567,658 | 9/1951 | Stough | 410/145 |
| 2,608,420 | 8/1952 | Eck | 410/149 |
| 2,980,037 | 4/1961 | Elsner | 410/144 |
| 3,062,157 | 11/1962 | Woods | 410/149 |
| 3,066,620 | 12/1962 | Schroeder | 410/147 |
| 3,137,248 | 6/1964 | Schroeder et al. | 410/147 |
| 3,411,459 | 11/1968 | Hyatt | 410/147 |
| 3,836,174 | 9/1974 | Holman, Jr. | 410/149 |
| 4,067,263 | 1/1978 | Naffa et al. | 410/144 |
| 4,079,677 | 3/1978 | Vandergriff et al. | 410/147 |
| 4,494,896 | 1/1985 | Franco | 410/148 |
| 4,650,383 | 3/1987 | Hoff | 410/149 |
| 4,797,043 | 1/1989 | William, Jr. | 410/145 |
| 4,815,905 | 3/1989 | Garcia, jr. | 410/128 |
| 5,104,269 | 4/1992 | Hardison | 410/149 |

Primary Examiner—Stephen T. Gordon
Attorney, Agent, or Firm—John F. Bryan

[57] ABSTRACT

A rectangular cargo retaining beam and anchoring track system has anchoring tracks with horizontally and vertically oriented slots on opposed cargo receptacle walls and beams having telescopically adjustable length and ends with hooks for engaging opposed slots. In the engaged position, at least one of the hooks is latched in place by a pivotal latching member which fills the length of the slot to prevent release of the hook unless the latching member is pivoted to disengage the slot. Protected, positive access for manual actuation and release of the latching member is provided at the long face of the rectangular beam so that the beam can be installed and released with the long axis either horizontal or vertical at the discretion of the user, without risk of the release mechanism being blocked by shifting cargo and, with the anchoring tracks being installed either vertically or horizontally.

19 Claims, 5 Drawing Sheets

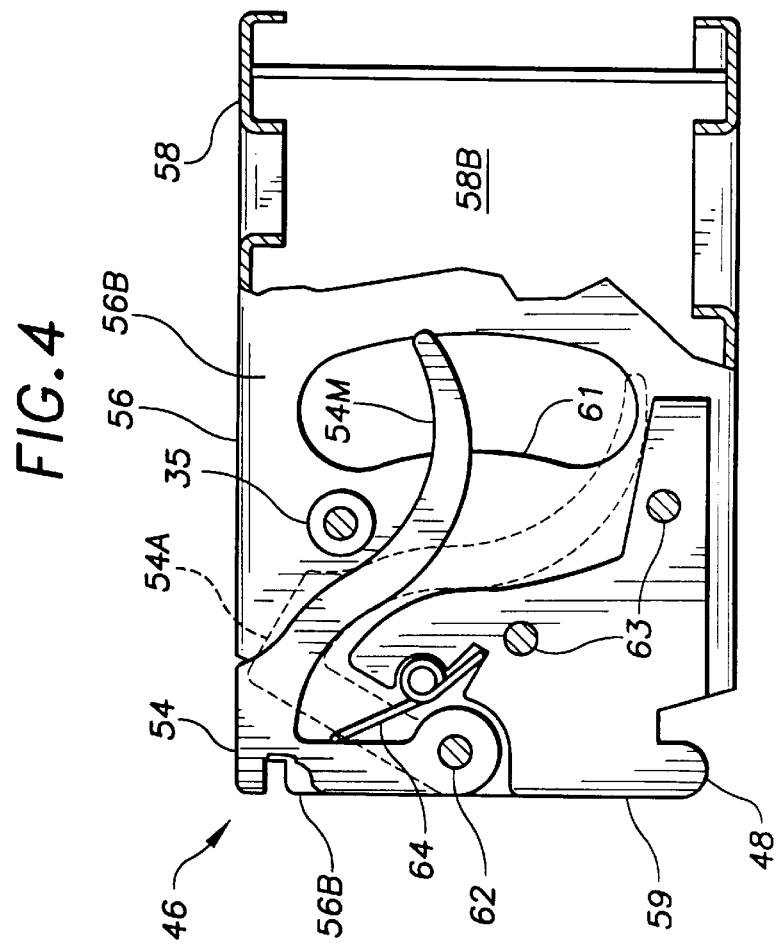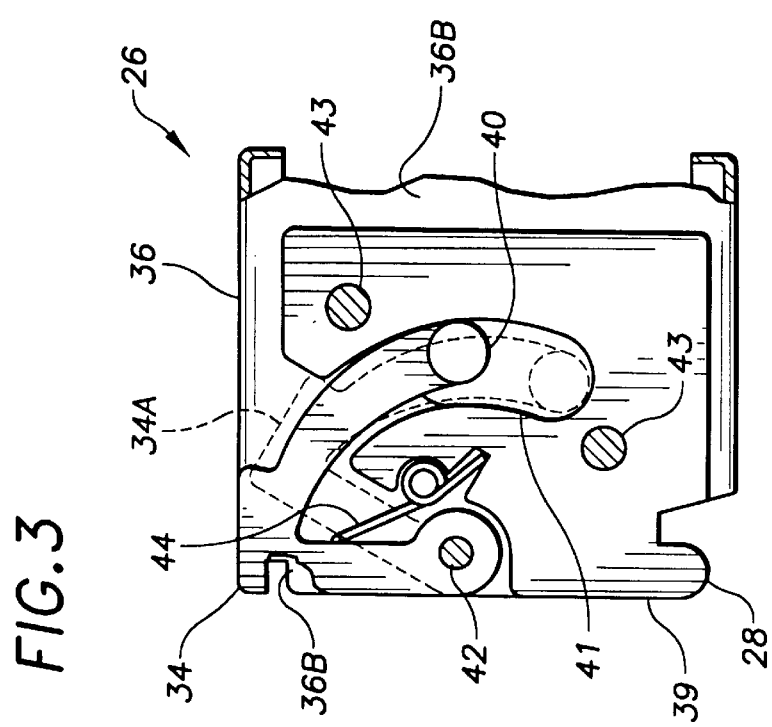

APPARATUS FOR SUPPORTING AND STABILIZING CARGO

FIELD OF THE INVENTION

The present invention pertains to the field of cargo supporting and stabilization systems, and in particular, to adjustable length beams and wall mounted tracks in a cargo receptacle into which such beams lock to either support or stabilize cargo.

BACKGROUND AND SUMMARY OF THE INVENTION

It is often desirable to carry cargo as a two-tiered, or double-decked, load. This situation may come about as a result of cargo which is not readily stackable for shipment, or in a mixed load situation, where heavier, awkward loading cargo is carried on the main cargo receptacle deck and lighter or relatively fragile freight is supported on the false deck. Also, cargo often takes the form of individual containers or units which, if not restrained, will shift about within the cargo receptacle. It is well known in the art to use telescoping, adjustable length cargo beams made of either round or rectangular tubing.

U.S Pat. No. 3,836,174. discloses a cargo beam having an elongated center portion of rectangular tubing with the long axis vertically disposed for stiffness, as required for double-decking. One end section is telescopically received within the center portion so as to provide incremental beam length adjustment. A second end section is telescopically fitted into the opposite end of the center section and outwardly biased by a compression spring. Downwardly extending hook members on both ends are inserted through vertical slots in opposite wall mounted tracks and serve to lock the beam in place when installed. The first end hook is engaged by tilting the beam as it is inserted, and locks in place as the beam is leveled. Thus, the second end hook must be inserted with the beam in a level attitude. The second end section includes a locking mechanism, with a spring loaded slide, which includes a tang member extending outwardly from the top of the end section. The slide fills the vertical clearance in the slot above the hook member when extended, so as to lock the second end section in its wall mounted track. The tang member engages an external sleeve, which can be manually displaced to retract the slide and allow withdrawal of the hook member. Removal of the beam requires actuating the sleeve against the slide spring force to retract the slide while, at the same time, overcoming the telescoping spring force to withdraw the end section. The effort involved is significant and a pinched finger is more than possible. There are also potential problems in exposure of the sleeve to being bent and jammed or its movement being blocked by cargo shifting in transit, so that removal is difficult and time consuming. If, however, this external sleeve were to be omitted, as in other known configurations, and the tang is made to extend sufficiently for easy operation, it becomes susceptible to breakage. If it is made short so as to avoid exposure to breakage, it is difficult to operate Another cargo beam known to be provided in the art is disclosed in U.S. Pat. No. 5,104,269. This beam comprises two opposed end sections telescopically received and outwardly spring loaded within an elongated center portion. Again, the center portion is a rectangular tube with the long axis placed vertically for double-decking strength and stiffness. Each end of the tube receives an end section, which engages a vertical slot in an anchoring track to attach the beam to the opposed cargo receptacle walls. The beam ends include lower hook members which are inserted into the mounting track vertical slots with the beam in a slightly raised position. The beam then drops to bottom in the slot where the hook members keep it from being withdrawn. To be unlocked and removed, an end section must be grasped and pressed inwardly, against the spring load as it is lifted upward. This is not always easily done, particularly when cargo has shifted to press against the beam.

Another known locking beam mechanism, exemplified by U.S. Pat. No. 3,411,459, utilizes an end section with pivotal hook members. Drawings of the disclosed embodiment indicate that the rectangular tubing sections used are oriented with the long axis of the cross-section horizontal, indicating a preference for providing greater section strength and stiffness in that plane, as needed for stabilizing cargo, at the expense of requiring a greater number of braces for double-decking applications. The downwardly extending hook members pivot into a locking position after insertion into closely fitting holes in a horizontal mounting track. A latching member, held in place by gravity related forces, is positioned so as to prevent tilting of the hook members with respect to the track after hooking the end section in place. A tab located at the top surface of the end section is manually displaced to open an access hole and withdraw the latching member, so that a finger can be inserted inside of the end section to disengage the hook member. There is some risk, in cargo stabilizing applications, that the access hole, being on top of the beam, may become covered by shifting cargo and therefore, difficult to access. This of course, is true of any top mounted release mechanism.

No matter the form of the locking mechanism, heavy duty cargo beams made in rectangular tube form for use with anchoring tracks are generally made for installation with the long axis of the rectangle vertical. This is commensurate with the primary strength requirement in the use of such beams being for double-decking. Equal cargo stabilizing stiffness in the horizontal plane is not available without penalty. Obviously, beams could be made with equal stiffness in both planes, but only as a heavier, more expensive and more cumbersome assembly. The simple, lightest weight and least expensive solution of allowing flexibility of choice for orientation of the stiffest axis of the beam is denied by the unavailability of openly accessible release means. While there is a recurring need in the industry for flexibility in double-decking and stabilizing of widely variegated freight, the need is not addressed by presently available freight stabilizing equipment because of weight and competitive price considerations. The thought of installing the presently available rectangular cargo stabilizing beams in other than the conventional, long axis vertical orientation is defeated by potential damage to the latch actuator or lack of access thereto. Thus, there is a continuing need for rugged, easily and safely operated stabilizing equipment. Furthermore, simplicity and low cost are essential considerations.

Objects of the present invention are therefore, first, to provide a cargo stabilizing beam system with the features of light weight and competitive cost necessary to market viability, and secondly to provide an ability for optional beam section orientation according to the cargo stabilizing need, A related object is to provide a beam attachment latch so as to allow positive, protected access for releasing the latch that cannot be blocked by shifting cargo, regardless of orientation, and another object is to provide a beam that is easily and safely operated in any application.

The present invention addresses these objects by providing a rectangular section, adjustable length beam, that operates without axial spring loading. Lower hook members are locked into receiving slots by latches and the latch actuating members are openly accessible through either long side of the rectangular cross-section and, furthermore, do not extend beyond the dimensions of the section. Thus, no matter how the beam is oriented for installation, the actuating member is both accessible and protected from damage. Full utilization of this accessibility is realized by also providing universal anchoring tracks with both horizontal and vertical slots, so that the beam may be installed with the long axis of the section either vertical or horizontal, at the user's option. Inasmuch as the beams of the present invention are adapted to horizontal or vertical installation, an unobvious benefit of the present invention is realized by mounting the universal track itself in vertical sections along the length of the opposed receptacle walls. With such an arrangement, the system achieves even greater flexibility as compared to prior art systems, in that the false deck may be spaced higher or lower for more efficient utilization of the total cubic capacity of the receptacle, while still using the beam to best advantage for supporting or stabilizing purposes. As an added bonus, the anchoring tracks may also be made to include round holes for installation of pre-existing, light duty, round section beam assemblies.

DESCRIPTION OF THE DRAWINGS

The aforementioned and other objects and features of the invention will be apparent from the following detailed description of specific embodiments thereof, when read in conjunction with the accompanying drawings, in which:

FIG. 3 is a section view detail showing the operation of the latching assembly of FIG. 2;

FIG. 4 is a section view detail showing the operation of an alternative latching assembly;

DETAILED DESCRIPTION OF THE PREFERRED EMBODIMENT

Figure 1:
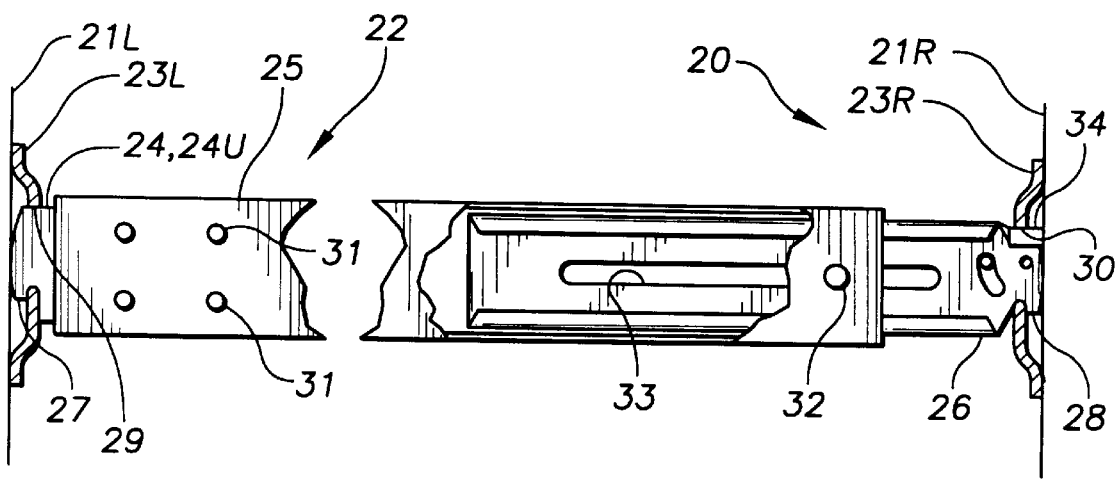
FIG. 1 shows the installation of a typical embodiment of the cargo stabilizing apparatus incorporating the present invention.

In FIG. 1 is shown a typical embodiment of cargo stabilizing apparatus 20 incorporating the present invention, as it is installed between cargo receptacle walls 21L and 21R. Apparatus 20 includes beam assembly 22 installed in anchoring tracks 23L and 23R and beam assembly 22 is seen to include rectangular tube 25, with locking end piece 24 and latching end assembly 26 fitted within the opposite ends thereof. Locking end piece 24 and latching end assembly 26 include hook members 27 and 28, extending into rectangular slots 29 and 30 respectively so as to engage anchoring tracks 23L and 23R. Locking end piece 24 is fixedly attached within rectangular tube 25 by rivets 31, and beam assembly 22 must be inclined at an angle in order to pass hook member 27 through and into rectangular slot 29. Having accomplished this, bringing beam assembly 22 to a position substantially perpendicular to wall 21L also rotates surface 24U of locking end piece 24 through and into rectangular slot 29, to fill the length thereof and provide locking engagement with anchoring track 23L, so long as perpendicularity is maintained. Latching end assembly 26 is fitted for telescopic movement within rectangular tube 25, with the limits of this movement being set by contact of retaining pin 32 with the ends of slot 33. Latching end assembly 26 includes pivotal latching member 34, which fills the length of rectangular slot 30 and holds hook member 28 in positive engagement with anchoring track 23R as is described below in greater detail.

Figure 7:
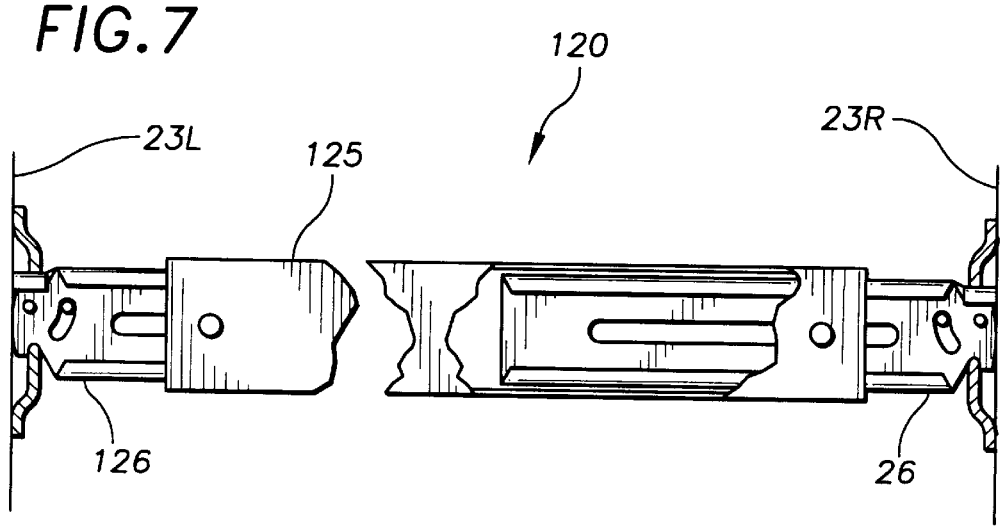
FIG. 7 shows an embodiment similar to FIG. 1 but with two telescoping end assemblies.

Beam assembly 22 may be configured as shown in FIG. 7 with a second telescoping and latching end assembly identical to telescoping and latching end assembly 26 of FIG. 1, rather than locking end piece 24 in rectangular tube 125 for installation between tracks 23L and 23R of FIG. 1. This provides the preferred embodiment of the present invention, in that it allows anchoring of both beam ends, in any sequence or orientation, without tilting.

Figure 2:
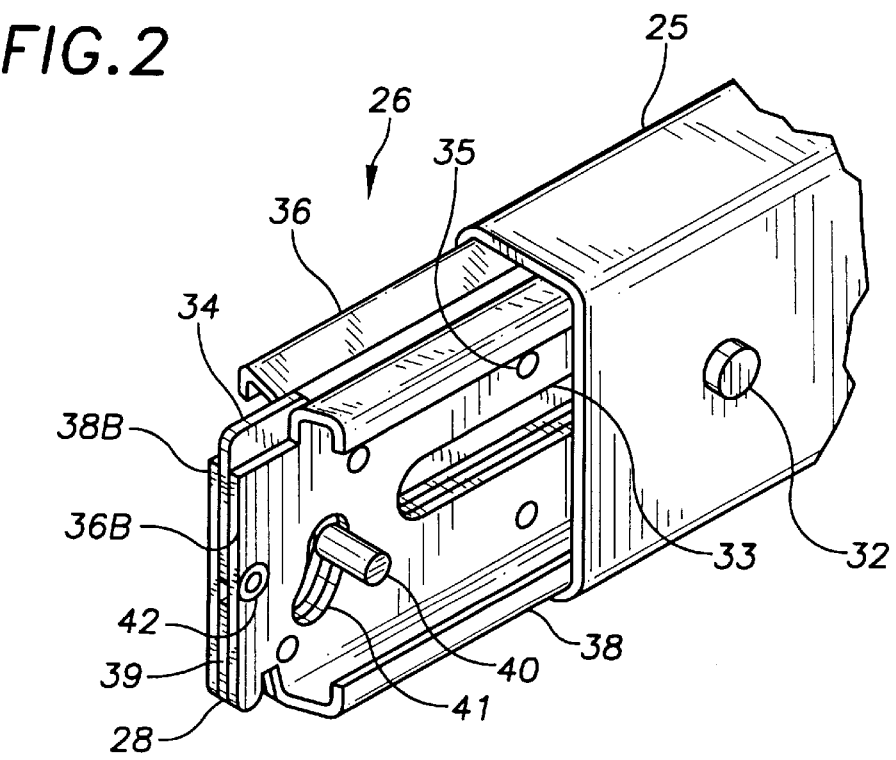
FIG. 2 shows a perspective view of an end section of the embodiment of FIG. 1.

FIG. 2 gives a perspective view of latching end assembly 26, where it is seen to be made up of "C" section members 36 and 38, joined together in back-to-back assembly. "C" section members 36 and 38 are riveted together, through back portions 36B and 38B, by a plurality of spacer-rivets 35, each of which includes an enlarged center section so as to create a uniform space between the members. Flange portions of "C" section members 36 and 38 are formed to provide a sliding fit of the members inside rectangular tube 25, with the "C" section back portions 36B and 38B lying parallel to the long axis of rectangular tube 25 and the open portions of "C" section members facing outwardly. Retaining pin 32 extends through rectangular tube 25, parallel to its short axis, and is confined within slot 33 so as to limit axial movement of the joined members 36 and 38 within rectangular tube 25. Back portions 36B and 38B of "C" section members 36 and 38 are shaped to make hook member 28 and this hook shape is duplicated in spacer plate 39. Latching member 34 is mounted on pivotal connection 42 and is somewhat thinner than spacer plate 39 so as to be free to pivot under spring loading as will be later described. Thus, latching member 34 can be displaced from the latching position in which it is shown, to a retracted, releasing position by manual actuator 40. Manual actuator 40 extends from latching member 34, through slots 41 and parallel to the rectangular short axis in both directions, but not so far as to extend beyond the protection of the flanges of "C" section members 36 and 38. Thus, no matter how the beam is oriented in a given installation or how cargo may shift, manual actuator 40 is protected from damage and accessability is assured.

FIG. 3 shows a section view through latching end assembly 26 taken as with "C" section member 38 removed so as to reveal the working of latching member 34. Here, pivotal connection 42 is seen to provide for rotation of latching member 34 from the latching position shown, to which it is urged by spring 44, to a second, releasing position 34A. Rivets 43 affix spacer plate 39 to latching end assembly 26 and, it is also to be noted that back portion 36B of "C" section member 36 extends to provide backing for hook member 28 in spacer plate 39 and support for pivotal connection 42. Spacer plate 39 is recessed to match slot 41 in back portion 36B and allow clearance for movement of the manual actuator.

FIG. 4 shows a section view through latching end assembly 46 taken as with "C" section member 58 removed so as to reveal the working of latching member 54. Here, pivotal connection 62 is seen to provide for rotation of latching member 54 from the latching position shown, to which it is urged by spring 64, to a second, releasing position 54A. Rivets 63 affix spacer plate 59 to latching end assembly 46 and spacer-rivet 35, one of a plurality which join "C" section member 56 into latching end assembly 46, is also shown. It is also to be noted that back portion 56B of "C" section member 56 extends to provide backing for hook member 48 in pacer plate 59 and support for pivotal connection 62. Spacer plate 59 is shaped to allow clearance for movement of manual actuator portion 54M of latching member 54 and access is provided for actuation thereof through slot 61 in back portion 56B.

Figure 5:
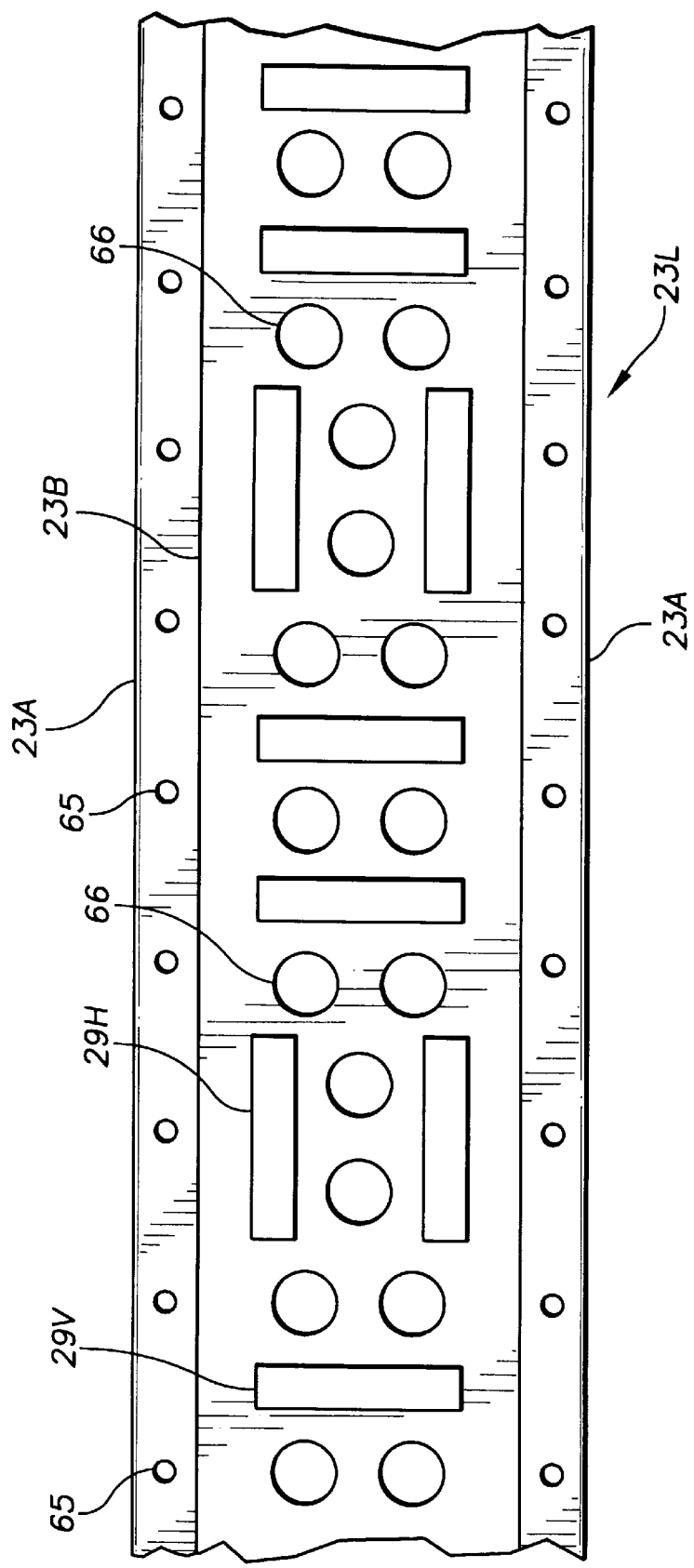
FIG. 5 is a plan view of either anchoring track of FIG. 1.
Figure 6:
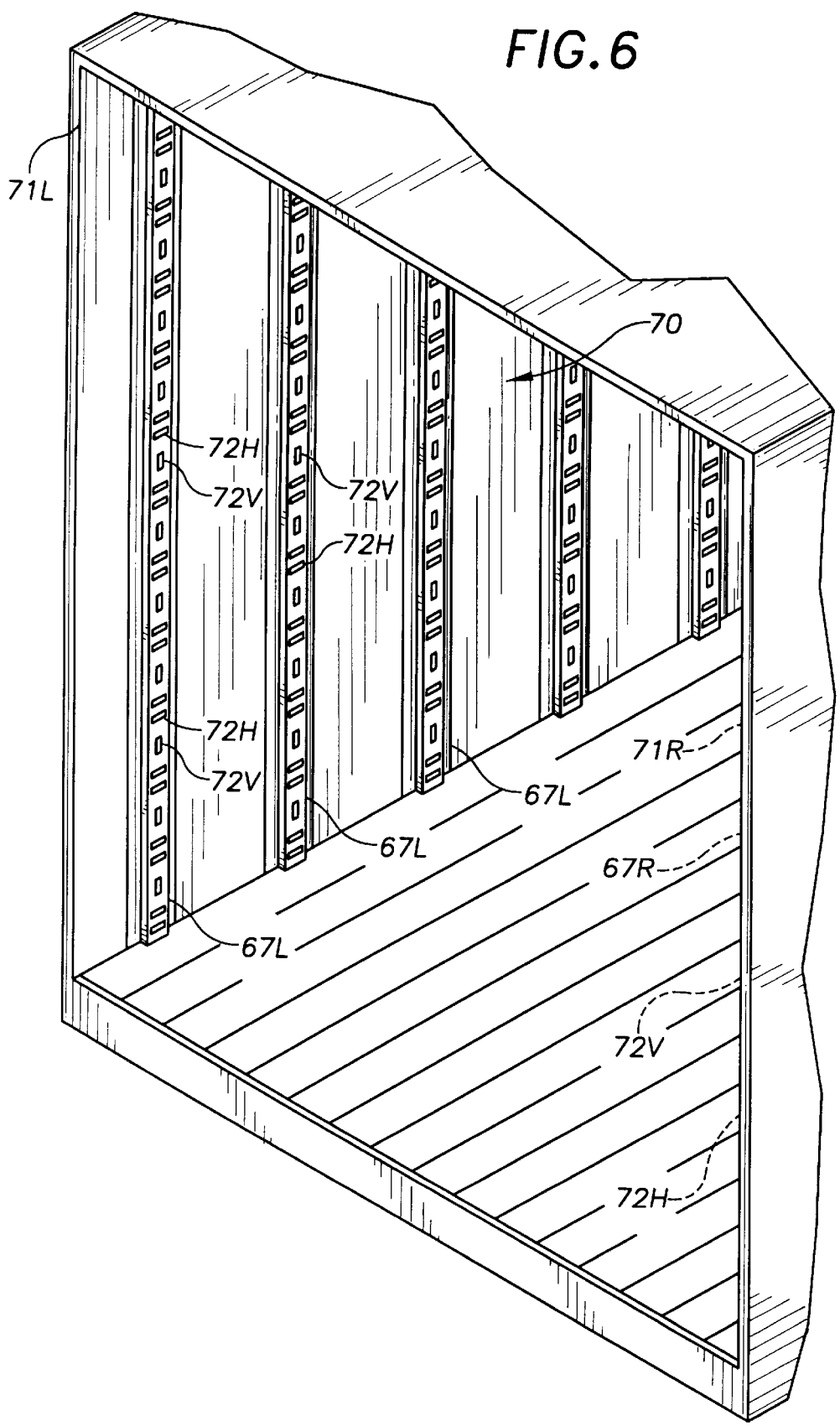
FIG. 6 is a view of an alternative installation of the cargo stabilizing apparatus incorporating the present invention.

FIG. 5 shows a plan view of anchoring track 23L, the same as anchoring track 23R. Anchoring tracks 23L and 23R are mounted horizontally on opposite cargo receptacle walls 21L and 21R as shown in FIG. 1 to provide matched hook engaging slots in opposed pairs for installation of cargo retaining beams such as beam assembly 22. As seen in FIG. 1, anchoring track 23L is formed in a "hat" section to provide mounting flanges 23A with attaching screw holes 65 and raised portion 23B with a plurality of hook engaging slots 29V and 29H for cargo beam attachment. Anchoring tracks 23L and 23R may also be given additional utility by providing mounting holes 66 for installation of round, light duty cargo beams, which are otherwise, not part of the present invention FIG. 6 shows anchoring track sections installed in an alternative embodiment 70. Here, track sections 67L and 67R are placed vertically, against cargo receptacle walls 71L and 71R, providing symmetrically opposed pairs of elongated slots in horizontal and vertical orientations 72H and 72V. In this manner, beam assemblies 22 of FIG. 1, may be installed at an optimum height, oriented to provide maximum strength and stiffness for either double-decking or cargo stabilization. Thus, where beam installation and orientation are inflexibly limited in the prior art, the present invention provides maximum efficiency for both beam usage and cubic capacity utilization.

Figure 8:
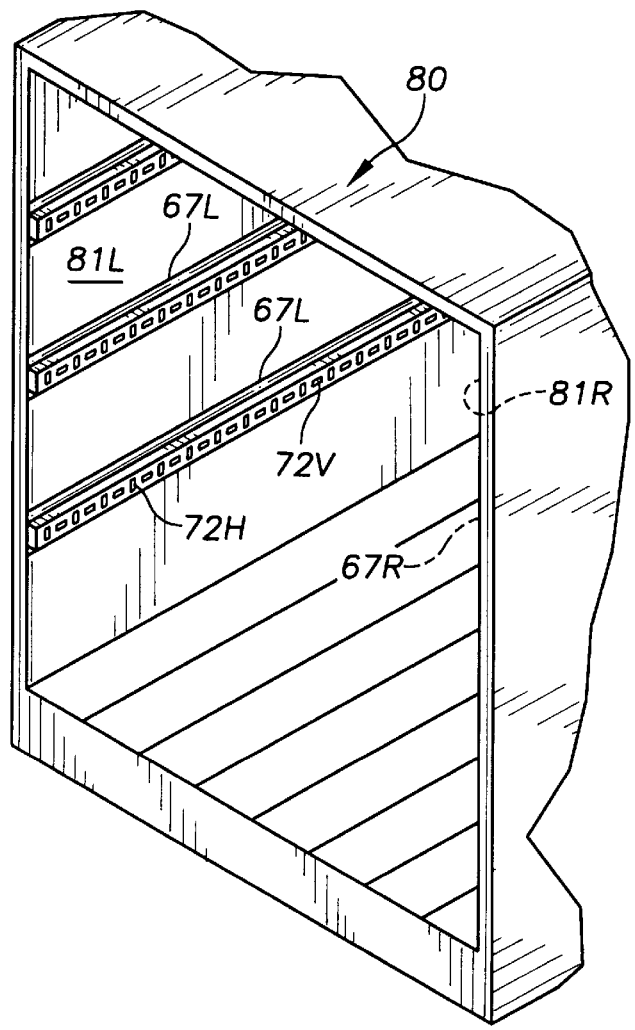
FIG. 8 is a view of an alternative installation of the cargo stabilizing apparatus incorporating the present invention.

FIG. 8 shows an alternative embodiment 80 wherein track sections 67L of FIG. 6 are installed horizontally against receptacle walls 81L and 81R. As a result, elongated slots 72H are now vertically oriented and elongated slots 72V are now horizontally oriented. Beam assembly 22 or 120 is installed in the same manner in either the embodiment of FIG. 6 or FIG. 8.

It is to be understood that the present invention is not limited to the embodiments disclosed but may also be expressed in other embodiments within the spirit of the invention, through rearrangement, modification or substitution of parts.

I claim:

1. Apparatus for bracing cargo contained in a cargo receiving zone between opposed walls of a cargo carrying receptacle comprising:
    a pair of opposed tracks positioned for installation on opposite sides of a cargo receiving zone, each track comprising a plurality of beam receiving slots;
    each of the beam receiving slots having a major axis, the major axes of some part of the plurality of beam receiving slots of each said opposed track being oriented in a horizontal plane and the major axes of another part of the plurality of beam receiving slots of each said opposed track being oriented in a vertical plane;
    the vertically oriented beam receiving slots of the opposed tracks being aligned to receive a beam therebetween;
    the horizontally oriented beam receiving slots of the opposed tracks being aligned to receive a beam therebetween; and
    a beam selectively engaged in any opposed ones of said beam receiving slots so as to be held perpendicular to the opposed walls.

2. Apparatus according to claim 1 wherein the beam has major and minor axes and the major axis of the beam is oriented vertically for supporting cargo by engagement in opposed ones of said beam receiving slots having the slot major axes oriented in a vertical plane.

3. Apparatus according to claim 1 wherein the beam has major and minor axes and the major axis of the beam is oriented horizontally for stabilizing cargo by engagement in opposed ones of said beam receiving slots having the slot major axes oriented in a horizontal plane.

4. Apparatus according to claim 1 wherein the pair of opposed tracks is positioned for installation on opposite sides of a cargo receiving zone with the length of the tracks in a horizontal plane.

5. Apparatus according to claim 1 wherein the pair of opposed tracks is positioned for installation on opposite sides of a cargo receiving zone with the length of the tracks in a vertical plane.

6. Apparatus according to claim 4 wherein the beam has major and minor axes and the major axis of the beam is oriented vertically for supporting cargo by engagement in opposed ones of said beam receiving slots having the slot major axes oriented in a vertical plane.

7. Apparatus according to claim 4 wherein the beam has major and minor axes and the major axis of the beam is oriented horizontally for stabilizing cargo by engagement with opposed ones of said beam receiving slots having the slot major axes oriented in a horizontal plane.

8. Apparatus according to claim 5 wherein the beam has major and minor axes and the major axis of the beam is oriented vertically for supporting cargo by engagement in opposed ones of said beam receiving slots having the slot major axes oriented in a vertical plane.

9. Apparatus according to claim 5 wherein the beam has major and minor axes and the major axis of the beam is oriented horizontally for stabilizing cargo by engagement with opposed ones of said beam receiving slots having the slot major axes oriented in a horizontal plane.

10. Apparatus for bracing cargo contained between opposed walls of a cargo carrying receptacle according to claim 1 wherein said first and second tracks further include a plurality of opposed pairs of round holes.

11. Apparatus for bracing cargo contained in a cargo receiving zone between opposed walls of a cargo carrying receptacle comprising:
    first and second opposed tracks positioned for installation on opposite sides of a cargo receiving zone, each track comprising a plurality of beam receiving slots;
    each of the beam receiving slots having a major axis, the major axes of a first part of the plurality of beam receiving slots of each said opposed track being oriented in a horizontal plane and the major axes of a second part of the plurality of beam receiving slots of each said opposed track being oriented in a vertical plane;
    the beam receiving slots of the first and second opposed tracks being aligned to receive a beam therebetween;
    at least one cargo stabilizing beam having a tubular center portion, the cross-section thereof being substantially rectangular, with orthogonal major and minor axes and long and short sides, the beam being engaged in opposed ones of said beam receiving slots so as to be held perpendicular to the opposed walls;

first and second opposed end assemblies extending from the center portion with at least the first end assembly being slideably received in the center portion, each said end assembly including a fixed hook member, the cross-section thereof having orthoganol major and a minor axis and long and short sides, for fitting into a said beam receiving slot when the hook member long axis and the beam receiving slot long axis are in similar orientation;

the second end assembly hook member engaging a said beam receiving slot in the second opposed track;

the first end assembly hook member engaging an opposed said beam receiving slot in the first opposed track;

at least the first end assembly including a latching member mounted on a pivotal axis parallel to the minor axes, for movement between a first, slot engaging position and a second, slot disengaging position, so as to latch the first end assembly hook member into the opposed beam receiving slot when in the first position and allow telescopically sliding movement of the first end assembly, for removal of its hook member from the opposed beam receiving slot, when in the second position; and an actuating member projecting from the latching member and not extending beyond the dimensions of the long and short sides of the first end assembly, said long and short sides of the first end assembly defining a protected zone to prevent accidental movement of the actuating member and the long sides having openings to provide access to the actuating member for manual disengagement of the latching member.

12. Apparatus according to claim 11 wherein the beam major axis is oriented vertically for supporting cargo by engagement in opposed ones of said beam receiving slots having the slot major axes oriented in a vertical plane.

13. Apparatus according to claim 11 wherein the beam major axis is oriented horizontally for stabilizing cargo by engagement with opposed ones of said beam receiving slots having the slot major axes oriented in a horizontal plane.

14. Apparatus according to claim 11 wherein the pair of opposed tracks is Positioned for installation on opposite sides of a cargo receiving zone with the length of the tracks in a horizontal plane.

15. Apparatus according to claim 11 wherein the pair of opposed tracks is positioned for installation on opposite sides of a cargo receiving zone with the length of the tracks in a vertical plane.

16. Apparatus according to claim 14 wherein the beam major axis is oriented vertically for supporting cargo by engagement in opposed ones of said beam receiving slots having the slot major axes oriented in a vertical plane.

17. Apparatus according to claim 14 wherein the beam major axis is oriented horizontally for stabilizing cargo by engagement with opposed ones of said beam receiving slots having the slot major axes oriented in a horizontal plane.

18. Apparatus according to claim 15 wherein the beam major axis is oriented vertically for supporting cargo by engagement in opposed ones of said beam receiving slots having the slot major axes oriented in a vertical plane.

19. Apparatus according to claim 15 wherein the beam major axis is oriented horizontally for stabilizing cargo by engagement with one of said beam receiving slots having the slot major axis oriented in a horizontal plane.

* * * * *